Patented Aug. 24, 1943

2,327,958

UNITED STATES PATENT OFFICE 2,327,958

FLUXING COMPOSITION

Charles A. Carey, Arlington, Mass., assignor to Dewey and Almy Chemical Company, North Cambridge, Mass., a corporation of Massachusetts No Drawing. Application September 14, 1939, Serial No. 294,939

14 Claims. (Cl. 148—23)

This invention relates to soldering, tinning and galvanizing fluxes of the metallic halide type, and particularly to those containing zinc chloride.

Metallic halides, alone and in combination with other substances, are widely used as fluxing materials because of their cheapness and ready availability. Zinc chloride crystals, for example, may be employed as a flux for low temperature soldering operations. In addition, ammonium chloride may be used as a flux for high temperature operations, but since it does not become active until very high temperatures are reached at which the ammonium chloride goes off as a gas, its use is attended by the production of highly unpleasant corrosive fumes.

When it is desired by reason of operating conditions and general expediency to produce a flux which is active at intermediate temperatures, it is common practice to mix together zinc chloride and ammonium chloride to form a flux of the so-called mixed salt type. As ammonium chloride is added to zinc chloride the melting point (and hence the temperature at which the mixture becomes active as a flux) in general decreases with increasing proportions of ammonium chloride, until substantially equal molecular proportions are reached. At this time the melting point rises rapidly until a composition is reached which will not melt, but which breaks down under heat, with the excess ammonium chloride going off as a gas. Although this furnishes a very convenient method for controlling the melting point, viscosity, and other properties of the flux, such salt mixtures are extremely deliquescent and are subject to caking in the container, which raises certain rather serious problems in connection with their storage and use.

A can of flux of the mixed salt type, if stored for any length of time will be found on opening to have changed from the small, separate, easily flowing crystals which were originally placed in the can into a single solid, extremely hard cake, which it is difficult if not impossible to break up and remove from the can. It is necessary to break the flux up with a hammer and chisel or allow the can to stand open in the air for a considerable time until the deliquescence of the flux has caused it to absorb moisture and go into a partially dissolved, rather soupy but at least pourable condition. Both these expedients, while possible as emergency measures, are time consuming and costly and represent an added expense in the use of the flux. In addition, caking is more pronounced in cans of flux which have once been opened to the air and allowed to pick up excess moisture from the atmosphere and then resealed. This presents an especially trying problem to the small manufacturer who must necessarily expect to use one can of flux for several different operations extending perhaps over a period of weeks.

Zinc chloride and ammonium chloride, when mixed together in certain proportions, react to form stable, non-deliquescent double salts. These double salts, for example $ZnCl_2.2NH_4Cl$, are easier to handle than the ordinary salt mixtures because they do not pick up moisture from the air, and consequently are the preferred fluxing materials for certain operations. Their use, however, is restricted to operation temperatures in excess of 650° F. since the salts do not melt below this temperature, and they possess the serious drawback that before they become effective as fluxes a certain amount of decomposition takes place, with the release of large quantities of ammonium chloride fumes. Moreover, although the zinc ammonium chloride double salts do not absorb moisture from the air, they are nevertheless subject to caking on prolonged storage.

Accordingly, it is an object of my invention to provide an effective method for adjusting the temperature at which a fluxing material of the metallic halide type becomes effective, and to bring about such temperature control by adding to the flux a material which does not cause caking. More specifically, this invention has for its object the production of a soldering flux of the double salt type and of any desired melting point, but of such composition that it is substantially non-caking, both on prolonged storage and on exposure to the air. These and other objects will become apparent from the description of my invention in the following paragraphs.

I have discovered that it is possible to control the temperature of operation of a flux which contains ammonium chloride by the addition to the flux of an alkaline compound which is capable of liberating ammonia from the ammonium chloride at elevated temperatures. These alkaline substances are not themselves possessed of any fluxing characteristics, but, I have discovered, the chemical reaction which they bring about at operating temperatures results in the production of highly active fluxing materials. Consequently, by varying the quantity of ammonium chloride present and the proportion of added alkaline material, I am able to prepare a flux of any desired melting point and of excellent fluxing characteristics.

I have discovered, furthermore, that the addition of such an alkali compound to a flux consisting of or containing ammonium chloride has another wholly unexpected and very desirable result, namely, that a substantially non-caking or only very slightly caking flux may be produced by this process. This is the case even when the alkaline material is added to a normally badly caking flux such as a flux of the mixed salt type described above. In addition, the liberation of ammonia rather than the highly corrosive acid ammonium chloride fumes is an important advantage from the standpoint both of machine maintenance and of the health of the users of the flux.

According to the preferred form of my invention, I add to a double salt such as the zinc ammonium chloride described above, a basic metallic compound which will liberate ammonia from the double salt at operating temperatures, and will itself combine with the halide ion, forming a metallic halide flux. I prefer to use zinc oxide as the basic metallic compound and I will describe my invention specifically with reference to this substance.

*Example I*

The following materials are weighed out and mixed thoroughly in a mixing machine:

| | Pounds |
|---|---|
| $ZnCl_2.2NH_4Cl$ double salt crystals | 200 |
| Zinc oxide | 42 |

The presence of the zinc oxide has the effect of lowering the melting point of the double salt, so that by varying the amount of added zinc oxide the melting point of the flux can be accurately controlled.

When this flux is heated, for example on a soldering bath at 500°–650° F., the zinc oxide reacts with the $ZnCl_2.2NH_4Cl$, liberating ammonia and forming a zinc-halogen salt which is capable of acting as a flux. It its uncertain at the present time whether the zinc-halogen salt formed is simply zinc chloride, or whether zinc oxychloride or zinc aminochloride results. However, no matter what exact course the chemical reaction takes, the end product formed is found to be equally as effective a soldering flux as one composed entirely of zinc chloride would be. Therefore, for the sake of brevity in the specification and claims, I will hereafter designate the metal-halogen compound formed by the chemical reaction at operating temperatures simply as a metallic halide, although I wish it to be understood that this term includes metallic oxyhalides and metallic amino-halides as well as the simpler metal-halogen compounds.

I have found that, working in accordance with the above example, in every case a flux is produced which is perfectly satisfactory as regards melting point, viscosity and fluxing activity. I have noticed, however, that the behavior of such a flux made with commercially obtained double salt is not constant with regard to caking. In some cases the flux produced is absolutely non-caking, while in others a tendency towards caking exists and further special treatment is necessary before a non-caking flux is obtained.

I believe that caking of commercially obtained zinc-ammonium double salts is caused by the gradual conversion of the mother-liquor adsorbed on its crystals (a solution containing zinc chloride and ammonium chloride) into crystalline zinc ammonium chloride, the moisture of the mother-liquor now being held as water of crystalization. The crystal growth which takes place causes bonds to be formed between the individual crystals, and large, hard lumps are gradually formed. This theory is borne out by the fact that it is possible by careful washing and drying to produce a sample of zinc ammonium chloride double salt which has no tendency towards caking. Moreover, the amount and composition of mother-liquor remaining on the crystals, and hence their tendency toward caking, varies widely between commercial lots.

When zinc oxide is added to a very pure non-caking sample of the double salt, a non-caking flux is produced. Furthermore, a non-caking flux may be produced by adding zinc oxide to a sample of the double salt which contains a small amount of adsorbed mother-liquor, but still enough to cause caking of the double salt. This effect is probably due to the fact that the zinc oxide acts as a diluent for the zinc ammonium chloride, decreasing the area of contact between the crystals and thus preventing their cementing together into hard lumps.

Fluxes formed by adding zinc oxide to samples of double salt which are very rich in adsorbed mother-liquor, however, will set to a solid cake in spite of the presence of the added zinc oxide. Such a composition may be converted into a non-caking flux simply by breaking up the formed cake. Once the material has been allowed to set and the cake disintegrated, the material will not cake again. The same result may be accomplished by subjecting the mixture of double salt and zinc oxide to continuous agitation for a period of several hours immediately after mixing, and I prefer to use the latter method in producing my improved flux. As a specific example of such treatment, a flux of the composition set forth in Example I may be placed in a tumble-barrel immediately after mixing, and agitated for a period of six hours, after which time it may be packaged and stored for long periods without danger of caking.

Without implying any limitations upon my invention, the following appears to be the most probable explanation of the above-described effect. I believe that zinc oxide in the presence of water combines with the zinc chloride of the mother-liquor to form a basic salt (similar to the composition known as Sorel cement) which cements the crystals of the flux together into a single hard lump. One of the ingredients of the mother-liquor necessary to cake formation is thus effectively removed from the mixture by chemical reaction and upon breaking up of the cake no re-caking can occur. In the preferred method where the mixture is subjected to continuous agitation, the reaction between the zinc oxide and the mother-liquor takes place, but the cementing of the crystals into a single cake is prevented. The desired effect is obtained, however, and the resulting material will remain free-flowing and will not cake. But whatever the true nature of the action of the zinc oxide, the fact remains that zinc ammonium double salts may be converted into non-caking fluxing materials by the addition of an alkaline material such as zinc oxide which reacts with the double salt at elevated temperatures to form active fluxing materials.

I have described my improved flux in the preferred form as containing a zinc ammonium chloride double salt and zinc oxide in certain proportions. These proportions may be varied to give a flux of any desired melting point and other properties. Furthermore, my invention is not limited to the use of double salts such as zinc ammonium chloride. The ammonium chloride alone is the part which undergoes chemical reaction with the zinc oxide, the zinc chloride of the double salt being present merely to reduce the melting point of the mixture. Accordingly, it is within the scope of my invention to vary the melting point and composition of the flux according to the purposes for which it is designed, by mixing together suitable proportions of ammonium chloride and zinc oxide or suitable proportions of zinc chloride, ammonium chloride and zinc oxide where the zinc and ammonium chloride are not present in suitable proportions to form a double salt. In all cases the addition of the alkaline material in accordance with the method of the above example will be found not only to regulate the melting point of the flux but also to produce a flux which exhibits little or no tendency to caking.

The following is an example of a flux which contains zinc oxide as the alkaline material and in which there is an excess of zinc chloride over the amount necessary to form a double salt. This flux has been found to be especially useful in cases where a very low ammonia content is desired in the molten flux.

Example II

| | Pounds |
|---|---|
| Zinc ammonium chloride crystals | 40 |
| Zinc chloride | 50 |
| Zinc oxide | 10 |

The ammonium chloride may be replaced by the halogen derivative of any of the homologous series of organic bases which are classified chemically as amines. For example, aniline hydrochloride or triethanolamine hydrochloride may be used with excellent results. In addition, any of the aliphatic amine hydrohalides may be employed instead of the ammonium chloride of the preferred examples. In some cases, the organic base liberated will be found to be volatile at soldering temperatures, but with higher members of the series a non-volatile, inert oil will be formed which in no way lowers the efficiency of the soldering flux, but rather even increases its effectiveness by forming an air-excluding oily film on the surface of the metal. For the sake of simplicity, the term amine as used in the appended claims is intended to include ammonia.

Furthermore, my invention may be carried into effect by replacing the zinc oxide of the preferred example with any compound which is sufficiently basic to react at elevated temperatures and liberate the amine portion of the halogen derivatives used in the flux. I have found that the basic compounds of those metals whose halogen derivatives possess fluxing properties are especially suited to the purposes of this invention. The oxides, hydroxides, or carbonates of such metals as zinc, calcium, magnesium, tin, antimony or lead have been found particularly advantageous.

Example III

An especially useful flux may be made according to the method of Example I, using the double salt and zinc carbonate in the following proportions:

| | Pounds |
|---|---|
| Zinc ammonium chloride crystals | 100 |
| Zinc carbonate | 15 |

Such a flux is substantially non-caking, inexpensive, and possesses highly desirable melting point, viscosity and fluxing characteristics.

Fluxes prepared according to my invention have been found to possess especially beneficial characteristics when used in the crystalline state for the preparation of molten fluxing baths, but they may also be used in pastes, for example those using petrolatum as a base, with the most desirable results. Furthermore, while the preferred embodiments have been disclosed in the above description and specific examples, it will be apparent to one skilled in the art that many variations therein may be made without departure from the spirit of the invention. Accordingly, my invention includes all modifications and equivalents falling within the scope of the appended claims.

I claim:

1. A flux which comprises a metallic halide which is capable of acting as a flux, a halogen derivative of an amine, and an insoluble metallic carbonate which at elevated temperatures is capable of liberating the amine portion of the halogen derivative, the proportions of the various constituents being adjusted so that the flux is substantially non-caking on long storage and exposure to the air and has the desired melting point, and so that the mixture when molten has the desired viscosity and fluxing characteristics.

2. A flux which comprises zinc chloride and ammonium chloride combined as a double salt and zinc carbonate, the proportions of the various constituents being adjusted so that the flux is substantially non-caking on long storage and exposure to the air and has the desired melting point, and so that the mixture when molten has the desired viscosity and fluxing characteristics.

3. A flux which comprises zinc chloride, ammonium chloride, and zinc carbonate in such proportions that the mixture will be substantially non-caking on long storage and exposure to the air, and that at the temperature of operation chemical reaction will take place and a compound suitable for use as a flux will be formed.

4. A flux which comprises ammonium chloride and zinc carbonate.

5. A flux which comprises a halogen derivative of an amine and the carbonate of a metal whose halides have fluxing properties and whose oxides are water-insoluble, the proportions of the various constituents being adjusted so that the flux is substantially non-caking on long storage and exposure to the air and has the desired melting point, and so that the mixture when molten has the desired viscosity and fluxing properties.

6. The process of producing a non-caking fluxing material which includes the steps of mixing together zinc oxide and a commercially obtained double salt of zinc chloride and ammonium chloride which is rich in mother-liquor, allowing the mixture to set to a solid cake and comminuting the formed cake.

7. The process of producing a non-caking fluxing material which includes the steps of mixing together zinc oxide and a commercially obtained double salt of zinc chloride and ammonium chloride which is rich in adsorbed mother-liquor and subjecting the mixture to continuous agitation for a period of time sufficient to allow completion of the reaction between the adsorbed mother-liquor and the zinc oxide.

8. The process of producing a non-recaking fluxing material composed of a metallic halide, a halogen derivative of an amine, and an insoluble alkaline compound which at elevated temperatures is capable of liberating the amine portion of the halogen derivative, which comprises converting the substances which tend to bring about caking into non-caking constituents by reacting them with the alkaline compound.

9. A non-caking solder bath flux comprising a zinc-amino halide double salt, together with a sufficient quantity of a zinc compound capable of releasing the amine portion of the double salt at the temperature of the soldering bath to form with the remaining portion of the double salt a liquid flux at temperatures of 500° to 650° F.

10. A non-caking solder bath flux comprising a zinc-amino halide double salt, together with a quantity of insoluble basic compound capable of releasing the amine portion of the double salt and in quantity sufficient, upon heating on the solder bath, to release sufficient amine to reduce the melting temperature of the mixture to that of a solder bath at 500° to 650° F.

11. A non-caking solder bath flux comprising zinc-ammonium chloride crystals together with a sufficient quantity of zinc oxide to release ammonia when placed on soldering baths at temperatures of 500° to 650° F. and to form with the remaining portion of the double salt a flux which is liquid at the temperature of the bath.

12. A solder bath flux comprising a mixture of zinc-ammonium chloride and zinc chloride, meltable at solder bath temperatures of 500° to 650° F., and containing a sufficiency of zinc oxide to prevent the release of acid fumes throughout the said temperature range.

13. A non-caking solder bath flux comprising zinc-ammonium chloride crystals bearing a coating of zinc oxychloride.

14. A non-caking solder bath flux comprising zinc-ammonium chloride crystals bearing surface coatings composed of the reaction product of zinc oxide and the mother-liquor from which the crystals have been deposited, and an excess of zinc oxide.

CHARLES A. CAREY.